US011739787B2

(12) United States Patent
Zhu

(10) Patent No.: US 11,739,787 B2
(45) Date of Patent: Aug. 29, 2023

(54) SUCTION CUP HOLDER FOR PHOTOGRAPHY EQUIPMENT AND CONVERSION COMPONENT THEREOF

(71) Applicant: ZHONGSHAN DASHAN PHOTOGRAPHIC EQUIPMENT CO., LTD., Zhongshan (CN)

(72) Inventor: Xihua Zhu, Zhongshan (CN)

(73) Assignee: ZHONGSHAN DASHAN PHOTOGRAPHIC EQUIPMENT CO., LTD., Zhongshan (CN)

( * ) Notice: Subject to any disclaimer, the term of this patent is extended or adjusted under 35 U.S.C. 154(b) by 277 days.

(21) Appl. No.: 17/321,490

(22) Filed: May 16, 2021

(65) Prior Publication Data

US 2022/0186770 A1 Jun. 16, 2022

Related U.S. Application Data

(63) Continuation of application No. PCT/CN2021/074053, filed on Jan. 28, 2021.

(30) Foreign Application Priority Data

Dec. 11, 2020 (CN) ......................... 202011447183.3

(51) Int. Cl.
*F16B 47/00* (2006.01)
*G03B 17/56* (2021.01)

(52) U.S. Cl.
CPC .......... *F16B 47/006* (2013.01); *G03B 17/561* (2013.01)

(58) Field of Classification Search
CPC ...... F16B 47/006; F16B 47/00; G03B 17/561; F16M 11/12
See application file for complete search history.

(56) References Cited

FOREIGN PATENT DOCUMENTS

WO WO-2016174255 A1 * 11/2016 ........... F16M 13/022

* cited by examiner

*Primary Examiner* — Minh Q Phan

(57) ABSTRACT

A conversion component of a suction cup holder for photography equipment includes a fastening component; and a locking component fixed on the fastening component. The locking component includes a locating member fastened on the fastening component, a movable member movably located between the fastening component and the locating member, and a resetting member arranged between the locating member and the movable member. A connecting member which is configured to be connected with photography equipment can pass through the fastening component and can be locked under a cooperation of the fastening component, the movable member and the resetting member.

10 Claims, 3 Drawing Sheets

200 416 417 417 410 411 412 413 41 415 414 422 420 5 42 201 210 421 202 203 31 3 2 32 1

SUCTION CUP HOLDER FOR PHOTOGRAPHY EQUIPMENT AND CONVERSION COMPONENT THEREOF

CROSS REFERENCE OF RELATED APPLICATIONS

The present application is a continuation-application of International (PCT) Patent Application No, PCT/CN2021/074053 filed on Jan. 28, 2021, the entire contents of which are hereby incorporated by reference.

TECHNICAL FIELD

The present disclosure relates to the field of photography, video recording, and more particularly to a suction cup holder for photography equipment and a conversion component thereof.

BACKGROUND

There are many sports cameras on the market. These sports cameras can be mounted in many applications (such as cars, bicycles, helmets, belts, chests, etc.) through a variety of holders. A sports camera can be located on a mounting surface through a suction cup holder. In the prior art, the suction cup holder usually includes a suction cup and a concave base covering an outside of the suction cap. After a lifting rod connected to a middle of the suction cup passes through a corresponding through hole on the concave base, a lifting and positioning can be performed by a lifting member (such as a nut or a buckle) to realize a vacuum function. However, the existing suction cup holder causes an installation and disassembly of a camera to be complicated and time: consuming, and may miss the best opportunity to capture the crucial moment of a photo or a video.

SUMMARY

The main objective of the present disclosure is to provide a suction cup holder for photography equipment which overcomes the above shortcomings and a conversion component having the suction cup holder.

The present disclosure provides a conversion component of a suction cup holder for a photography equipment, including: a fastening component; and a locking component fixed on the fastening component; wherein the locking component includes a locating member fastened on the fastening component, a movable member movably located between the fastening component and the locating member, and at least one resetting member arranged between the locating member and the movable member, a connecting member which is configured for being connected with a photography equipment is capable of passing through the fastening component and being locked under a cooperation of the fastening component, the movable member and the at least one resetting member.

In some embodiments, the fastening component includes a main body with a first through hole and a second through hole provided thereon, the connecting member is mounted on the suction cup holder via the first through hole, and the movable member penetrates from the second through hole.

In some embodiments, the locating member forms a locating groove having an opening facing the main body, and a side of the locating groove facing the second through hole is provided as a side opening, the movable member is inserted into the locating groove through the side opening.

In some embodiments, an inner side of each of two parallel side walls of the locating groove is provided with a boss extending inwardly adjacent to the side opening, each of two side ends of the movable member is respectively provided with a abutting section extending in a direction perpendicular to a moving direction of the movable member.

In some embodiments, the movable member is provided with a connecting hole that opens toward the locating member.

In some embodiments, the connecting hole includes a first section, a second section, and a third section in a direction parallel to a moving direction of the movable member from inside to outside, and an inner diameter of the second section in a direction perpendicular to the moving direction is smaller than an inner diameter of the first section in the direction.

In some embodiments, the connecting member includes a threaded portion for connecting the photography equipment, a first non-circular portion, a cylindrical portion and a second non-circular portion in sequence along an axial direction of the connecting member, the first non-circular portion is capable of being received in the first through hole of the main body, and an outer diameter of the cylindrical portion is smaller than both an outer diameter of the first non-circular portion and an outer diameter of the second non-circular portion.

In some embodiments, the movable member is located between the first non-circular portion and the second non-circular portion in a direction perpendicular to the moving direction of the movable member when the movable member is in its locked position.

In some embodiments, each of the at least one resetting member includes a mounting post mounted in the locating member and an elastic element mounted around the mounting post, two ends of the elastic element abut against the locating member and the movable member respectively.

The present disclosure further provides a suction cup holder for photography equipment, including: a suction cup; a base covering the suction cup; a lifting member passing through the base and connected to the suction cup; and the above conversion component connected to the base.

The suction cup holder for photography equipment and the conversion component thereof provided by the present disclosure are simple in the structure, compact, easy to carry and convenient to assemble and disassemble. The suction cup holder for photography equipment and the conversion component thereof can achieve locking automatically, has a reliable locking effect and improves the security of the connection.

Reference signs: 200: suction cup holder; 1:1 suction cap; 2: base; 3: lifting member; 31: handle; 32: eccentric section; 4: conversion component; 41: fastening component; 410: main body; 411: first through hole; 412: second through hole; 413: third through hole; 414: flange; 415: first mounting hole; 416: first connecting member; 417: second connecting member; 42; locking component; 420: locating member; 201: locating groove; 202: projection; 203: second mounting hole; 204: fixed hole; 205: non-circular hole; 206: boss; 421: movable member; 210: connecting hole; 211: first section; 212: second section; 213: third section; 214: abutting section; 215: locating hole; 422: resetting member; 221: mounting post; 222: elastic element; 223: fastening section; 5: connecting member; 51: threaded portion; 52: first non-circular portion; 53: cylindrical portion; 54: second non-circular portion.

DESCRIPTION OF THE EMBODIMENTS

The present disclosure will be further described in detail with reference to the accompanying drawings and embodiments so that the objective and the advantages of the present disclosure will be more apparent.

Figure 1:
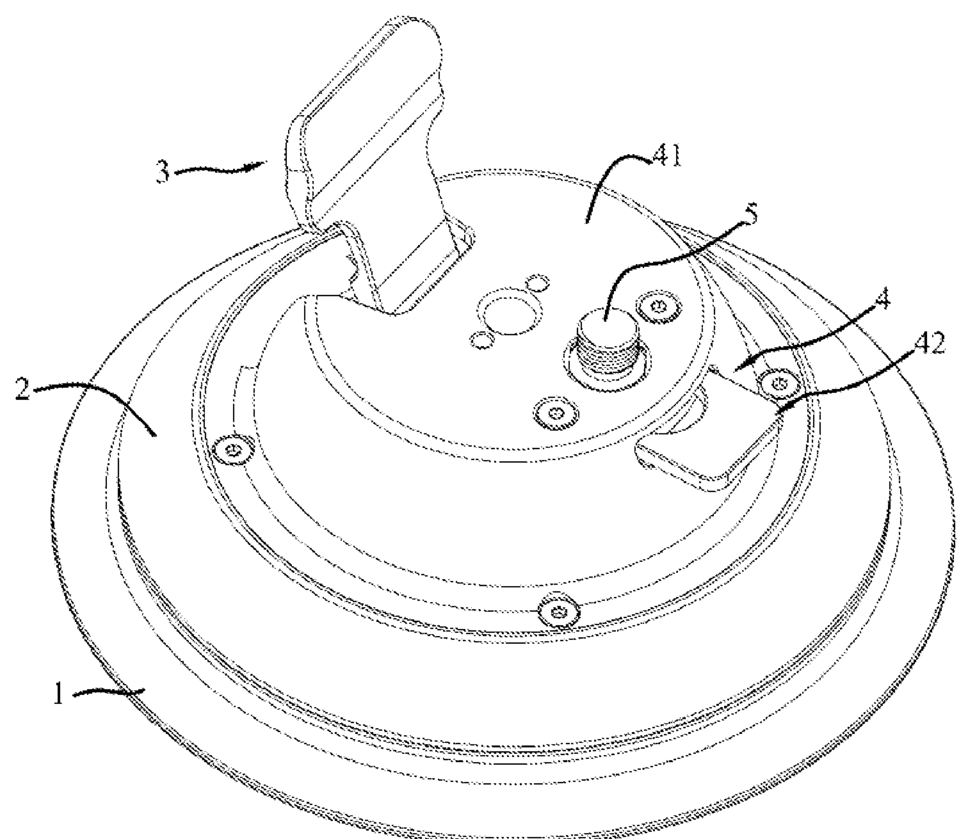
FIG. 1 is a schematic view of a suction cup holder for photography equipment according to one embodiment of the present disclosure.
Figure 2:
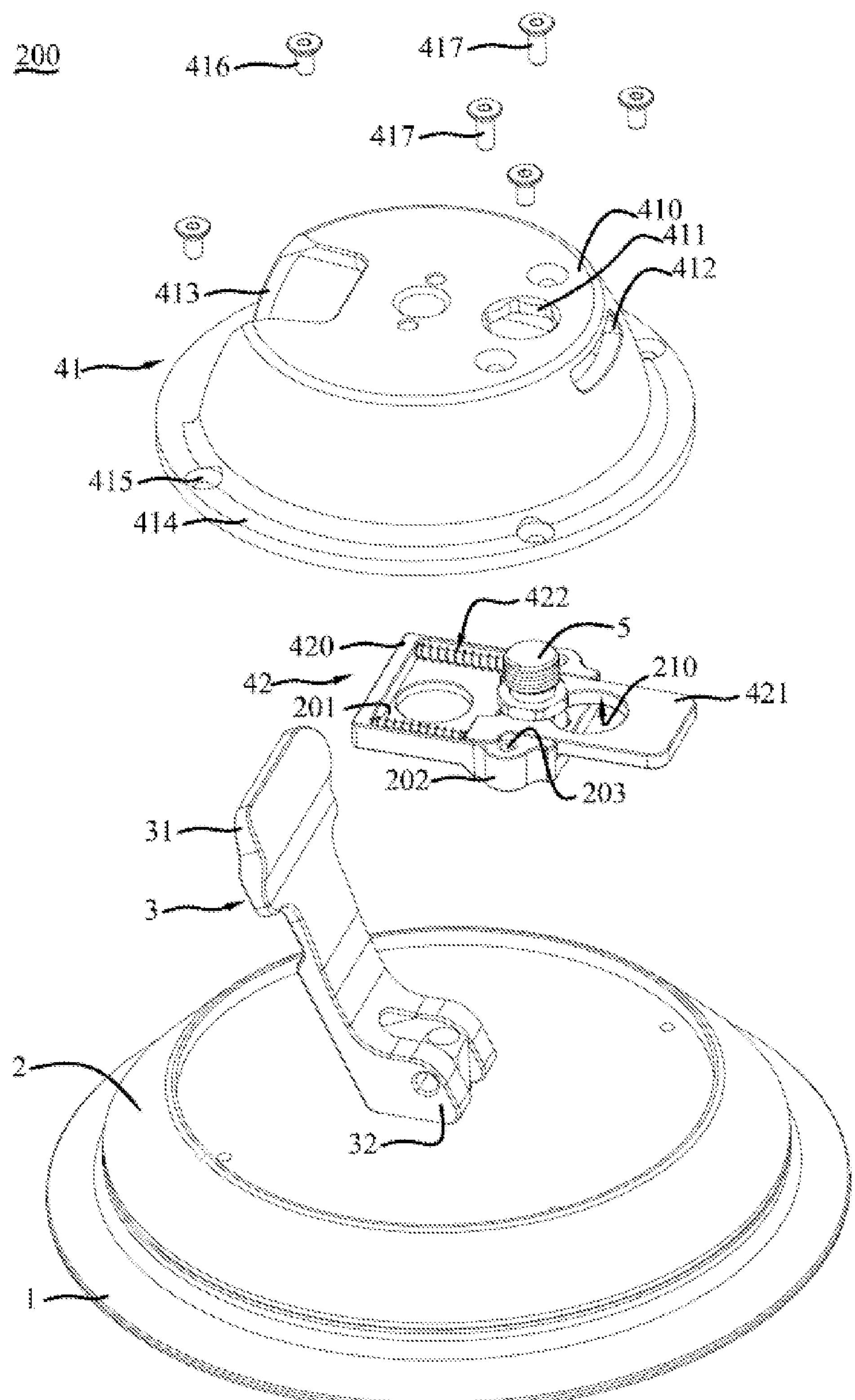
FIG. 2 is an exploded view of the suction cup holder shown in FIG. 1.

Referring to FIGS. 1 and 2, a suction cup holder 200 for a photography equipment according to one embodiment of the present disclosure includes a suction cup 1, a base 2 attached to a circumference of the suction cup 1 with a space defined therebetween, a lifting member 3 passing through the base 2 and connected to the suction cup 1, and a conversion component 4 connected to the base 2. In this embodiment, the lifting member 3 is provided in the form of a buckle, including a handle 31 which can be rotated by a user and an eccentric section 32 provided at a bottom end of the handle 31. The eccentric section 32 is pivotally connected with a connecting bar by a pin, and the connecting bar extends through the base 2 and is connected to a top of the suction cup L A distance from an outer end edge of the eccentric section 32 to the pin is greater than an adjacent outer lateral edge of the eccentric section to the pin, such that rotation of the handle 31 relative to the base 2 would cause the suction cup 1 to transform from a vacuum state to a released state (or from the released state to the vacuum state), so that the suction cup holder 200 is attached to a mounting surface or removable from the mounting surface accordingly. In addition, the specific structures of the suction cup 1, the base 2 and the lifting member 3 of the suction cup holder 200 and the specific connections thereamong may adopt the known designs in the art, which will not be described in detail here.

In this embodiment, the conversion component 4 includes a fastening component 41 and a locking component 42 fixed on the fastening component 41. The fastening component 41 includes a main body 410 with a first through hole 411, a second through hole 412 and a third through hole 413 provided thereon. In this embodiment, the main body 410 forms a receiving space with an open bottom end. Specifically, the main body 410 includes a top wall and a side peripheral wall extending from an outer periphery of the top wall in a flared manner. Optionally, the side peripheral wall may be substantially perpendicular to the top wall. Preferably, the above-mentioned first through hole 411 is provided at the end of the main body 410 opposite to the open end, i.e., on the top wall. The second through hole 412 is provided at the side peripheral wall of the main body 410. The third through hole 413 is opened at the top wall and the side peripheral wall and the junction therebetween. The lifting member 3 and the conversion component 4 are inserted through the main body 410. Specifically, the lifting member 3 and the conversion component 4 are respectively partially located in the receiving space formed by the main body 410. In this embodiment, the handle 31 of the lifting member 3 passes through the third through hole 413, that is, the handle 31 can be rotated within a limited space defined by the top wall and the side peripheral wall of the main body 410. In this embodiment, the first through hole 411 is provided between the second through hole 412 and the third through hole 413. In addition, the open end of the main body 410 is provided with a flange 414 extending outward in a radial direction of the main body 410. In this embodiment, the flange 414 is provided with a plurality of first mounting holes 415. A corresponding number of first connecting members 416 pass through the respective first mounting holes 415 to fixedly connect the fastening component 41 to the base 2. Preferably, the first connecting members 416 may be screws.

Figure 3:
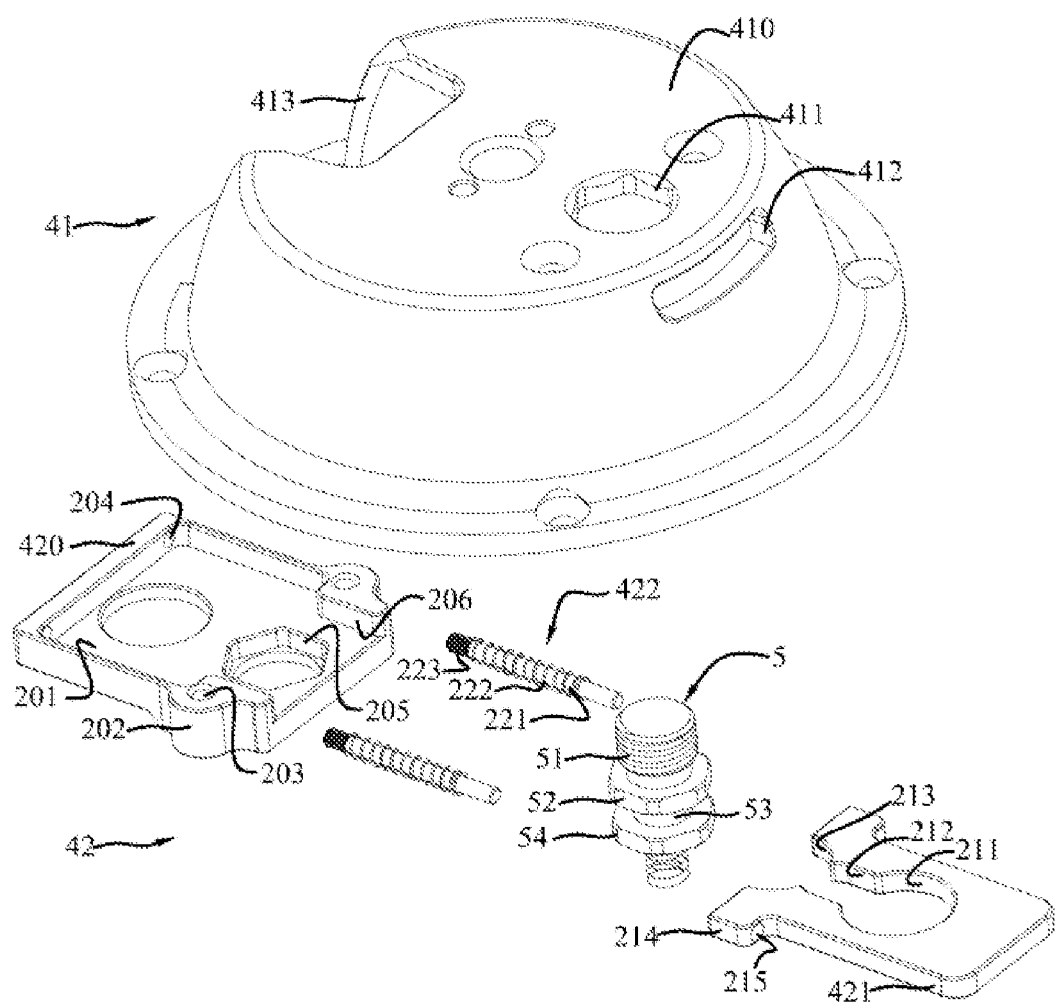
FIG. 3 is an exploded view of a conversion component of the suction cup holder shown in FIG. 1.

Referring also to FIGS. 2 and 3, in this embodiment, the locking component 42 is fastened on the fastening component 41 via a second connecting member 417. Further, the locking component 42 is fastened on an inner side of the top wall of the main body 410 of the fastening component 41 and partially passes through the second through hole 412 on the side peripheral wall of the main body 410. The locking component 42 includes a locating member 420 fixed to the fastening component 41, a movable member 421 movably arranged between the fastening component 41 and the locating member 420, and at least one resetting member 422 arranged between the locating member 420 and the movable member 421 and configured for returning the movable member 421.

In this embodiment, the locating member 420 forms a locating groove 201. Preferably, the locating groove 201 is configured as a square slot. The locating groove 201 has an opening facing the main body 410 of the fastening component 41, and a side of the locating groove 201 facing the second through hole 412 is provided as a side opening. In other words, there are three side walls surrounding the locating groove 201, and the side opening is defined between the two parallel side walls. Each of the two parallel side walls of the locating groove 201 is provided with a projection 202 extending outward at an outer side thereof. Each projection 202 is provided with a second mounting hole 203 parallel to a height direction of the corresponding side wall. Two second connecting members 417 respectively pass through the main body 410 of the fastening component 41 and are engaged in the corresponding second mounting holes 203 to fasten the locating member 420 on the fastening component 41. The opening of the locating groove 201 is covered by the main body 410 of the fastening component 41. Thus, the locating member 420 and the fastening component 41 form a receiving space for the movable member 421, wherein the movable member 421 can move relative to the locating member 420 in the receiving space.

In this embodiment, the movable member 421 is shaped as a plate. The movable member 421 is provided with a connecting hole 210 that opens towards the locating member 420. The connecting hole 210 is recessed from one side of the movable member 421. In a direction parallel to a moving direction of the movable member 421, the connecting hole 210 includes a first section 211, a second section 212, and a third section 213 in sequence from inside to outside communicated one another, wherein the first section 211 and the third section 213 are communicated via the second section 212. In this embodiment, the first section 211 is configured as a circle, the second section 212 is configured as a part of a circle, and the third section 213 is also configured as a part of a circle. An inner diameter of the second section 212 (a size of the second section 212 in a moving direction perpendicular to the movable member 421) is smaller than an inner diameter of the first section 211 in the same direction.

A connecting member 5 is restricted at the second section 212 of the connecting hole 210. The connecting member 5 includes, along an axial direction thereof, a threaded portion 51 for connecting photography equipment (such as a video camera, a camera, etc.), a first non-circular portion 52, a cylindrical portion 53 and a second non-circular portion 54 in sequence. Preferably, the first non-circular portion 52 and the second non-circular portion 54 are configured to have the same structure. In this embodiment, both the first non-circular portion 52 and the second non-circular portion 54 are configured in a hexagonal shape. The first through hole 411 of the fastening component 41 is shaped corresponding to the first non-circular portion 52, that is, the first through hole 411 is also non-circular, and the first non-circular portion 52 is received in the first through hole 411, which prevents the connecting member 5 from rotating relative to the fastening component 41.

The cylindrical portion 53 of the connecting member 5 is configured to be engaged in the connecting hole 210 of the movable member 421. In this embodiment, an outer diameter of the cylindrical portion 53 is smaller than an outer diameter of the first non-circular portion 52 and smaller than an outer diameter of the second non-circular portion 54. The inner diameter of the second section 212 of the connecting hole 210 is not less than the outer diameter of the cylindrical portion 53, but smaller than the outer diameter of the first non-circular portion 52 and the outer diameter of the second non-circular portion 54, and thus the movable member 421 is retained between the first non-circular portion 52 and the second non-circular portion 54 when the cylindrical portion 53 of the connecting member 5 is engaged in the second section 212 of the movable member 421. As the inner diameter of the third section 213 of the connecting hole 210 is larger than the outer diameter of the second non-circular portion 54, such that the second non-circular portion 54 can enter into the connecting hole 210 via the third section 213. The inner diameter of the first section 211 of the connecting hole 210 is larger than the outer diameter of the second non-circular portion 54 such that the connecting member 5 can be released via the first section 211 of the connecting hole 210. When locking the connecting member 5 onto the suction cup 1, the connecting member 5 is inserted into the connecting hole 210 via the third section 213, and then the cylindrical portion 53 is engaged at the second section 212 of the connecting hole 210 of the movable member 421, and thus the connecting member 5 as well as the photography equipment is retained at the fastening component 44, When releasing the connecting member 5 from the suction cup 1, the movable member 421 is pressed inwards via the second through hole 412 so that the second non-circular portion 54 is moved to the first section 211, then the connecting member 5 as well as the photography equipment can be removed from the movable member 421 at the first portion 211.

In this embodiment, the movable member 421 can be moved relative to the locating member 420 in a restricted manner, Each of the two parallel side walls of the locating groove 201 of the locating member 420 is provided with a boss 206 extending inwardly adjacent to the side opening. A distance between the two bosses 206 is smaller than a distance between the two parallel side walls of the locating groove 201. The two bosses 206 stop the movable member 421, thereby limiting a further movement of the movable member 421 relative to the locating member 420. Specifically, two ends of the movable member 421 adjacent to the third section 213 are each provided with a abutting section 214 extending in a direction perpendicular to the moving direction of the movable member 421. During the movement of the movable member 421, the two abutting sections 214 are respectively stopped by the corresponding bosses 206 to prevent the movable member 421 from being separated from the locating member 420.

When the abutting sections 214 of the movable member 421 abut on the bosses 206, the connecting member 5 is locked by the movable member 421. The movable member 421 can be moved inwardly towards the side wall of the locating groove 201 of the locating member 420 opposite to the side opening until the connecting member 5 is engaged in the first section 211 of the connecting hole 210 of the movable member 421, at that time the connecting member 5 as well as the photography equipment connected thereto can be released.

In order to realize the positioning of the movable member 421 at its locked position and the returning from its released position, the at least one resetting member 422 is arranged in the locating groove 201. In this embodiment, the at least one resetting member 422 includes two resetting members. Each resetting member 422 includes a mounting post 221 mounted in the locating groove 201 and an elastic element 222 mounted around the mounting post 221. One axial end of the mounting post 221 is fixed at the side wall opposite to the side opening, and the other axial end of the mounting post 211 extends towards the boss 206, In this embodiment, the side wall of the locating groove 201 opposite to the side opening is provided with a receiving hole, the axial end of the mounting post 221 inserts into the receiving hole. In particular, the mounting post 221 includes a fastening section 223 which can be fastened in the through hole. In this embodiment, the abutting section 214 of the movable member 421 is provided with a locating hole 215 along the moving direction. The other axial end of the mounting post 221 passes through the locating hole 215 and thus the movable member 421 is mounted on the mounting post 221 and is movable along the mounting post 221.

Preferably, the elastic element 222 is a spring. The elastic element 222 is arranged between the side wall of the locating member 420 and the movable member 421. When the movable member 421 is moved towards the side wall of the locating member opposite to the opening, the elastic element 222 is compressed; when a pressure applied on the movable member 421 is removed, the movable member 421 returns to its locked position under an action of the elastic element 222.

In addition, in this embodiment, in order to further prevent the connecting member 5 from rotating relative to the suction cup 1, a non-circular hole 205 for receiving the second non-circular portion 54 of the connecting member 5 is provided at a bottom of the locating groove 201 of the fastening component 41 aligned with the first mounting hole 415. Preferably, the shape of the non-circular hole 205 is consistent with the shape of the second non-circular portion 54.

The suction cup holder for photography equipment and the conversion component thereof provided by the present disclosure are simple in the structure, compact, easy to carry and convenient to assemble and disassemble. The suction cup holder for photography equipment and the conversion component thereof can achieve locking automatically, with a reliable locking effect which improves the security of the connection.

The above is only preferred embodiments of the present disclosure, and is not intended to limit the present disclosure. Any modifications, equivalent substitutions and improvements made within the spirit and principles of the present disclosure should be included in the scope of protection of the present disclosure.

What is claimed is:

1. A conversion component of a suction cup holder for photography equipment, comprising:

a fastening component; and a locking component fixed on the fastening component;

wherein the locking component comprises a locating member fastened on the fastening component, a movable member movably located between the fastening component and the locating member, and at least one resetting member arranged between the locating member and the movable member, a connecting member which is configured for being connected with a photography equipment is capable of passing through the fastening component and being locked under a cooperation of the fastening component, the movable member and the at least one resetting member.

2. The conversion component according to claim 1, wherein the fastening component comprises a main body with a first through hole and a second through hole provided thereon, the connecting member is mounted on the suction cup holder via the first through hole, and the movable member penetrates from the second through hole.

3. The conversion component according to claim 2, wherein the locating member forms a locating groove having an opening facing the main body, and a side of the locating groove facing the second through hole is provided as a side opening, the movable member is inserted into the locating groove through the side opening.

4. The conversion component according to claim 3, wherein an inner side of each of two parallel side walls of the locating groove is provided with a boss extending inwardly adjacent to the side opening, each of two side ends of the movable member is respectively provided with a abutting section extending in a direction perpendicular to a moving direction of the movable member.

5. The conversion component according to claim 2, wherein the movable member is provided with a connecting hole that opens toward the locating member.

6. The conversion component according to claim 5, wherein the connecting hole comprises a first section, a second section, and a third section in a direction parallel to a moving direction of the movable member from inside to outside, and an inner diameter of the second section in a direction perpendicular to the moving direction is smaller than an inner diameter of the first section in the direction.

7. The conversion component according to claim 6, wherein the connecting member comprises a threaded portion for connecting the photography equipment, a first non-circular portion, a cylindrical portion and a second non-circular portion in sequence along an axial direction of the connecting member, the first non-circular portion is capable of being received in the first through hole of the main body, and an outer diameter of the cylindrical portion is smaller than both an outer diameter of the first non-circular portion and an outer diameter of the second non-circular portion.

8. The conversion component according to claim 7, wherein the movable member is located between the first non-circular portion and the second non-circular portion in a direction perpendicular to the moving direction of the movable member when the movable member is in its locked position.

9. The conversion component according to claim 7, wherein each of the at least one resetting member comprises a mounting post mounted in the locating member and an elastic element mounted around the mounting post, two ends of the elastic element abut against the locating member and the movable member respectively.

10. A suction cup holder for photography equipment, comprising:

a suction cup;

a base covering the suction cup;

a lifting member passing through the base and connected to the suction cup; and a conversion component according to claim 1, the conversion component is connected to the base.

* * * * *